United States Patent Office 2,922,803
Patented Jan. 26, 1960

2,922,803

DI-CYCLOPENTADIENYL DI-TITANIUM HEXA-HALIDE AND PROCESS OF PREPARATION

Daniel Kaufman, Metuchen, N.J., assignor to National Lead Company, New York, N.Y., a corporation of New Jersey No Drawing. Application August 27, 1958
Serial No. 757,459

6 Claims. (Cl. 260—429.5)

This invention relates in general to titanium compositions and more specifically to stable titanium-carbon bonded compositions.

A number of stable titanium-carbon bonded compositions have previously been prepared and among these are biscyclopentadienyltitanium di-halide, mono-cyclopentadienyltitanium tri-halide and mono-cyclopentadienyltitanium di-alkoxide mono-halide. The latter two compositions and their method of preparation are more fully described and claimed in co-pending application Serial No. 443,956, filed July 16, 1954, by Daniel F. Herman, said application being assigned to the same assignee as the instant application.

Such compositions are of interest as catalytic agents and as reagents in various organic reactions for the preparation of other organic compounds. It is desirable however, to widen the applications of these compositions by producing derivatives thereof which are useful in other organic systems.

An object of the instant invention therefore is to produce derivatives of precursors of the group consisting of mono-cyclopentadienyltitanium tri-halide and mono-cyclopentadienyltitanium di-alkoxide mono-halide compounds. A further object is to produce derivatives which will have applications other than those of the precursors themselves. A further object is to provide a method for producing derivatives of mono-cyclopentadienyltitanium tri-halide or mono-cyclopentadienyltitanium di-alkoxide mono-halide. These and other objects will become more apparent from the following more complete description of the instant invention.

Broadly, this invention contemplates a compound comprising di-cyclopentadienyl di-titanium hexa-halide represented by the formula $(C_5H_5)_2Ti_2X_6$ where the cyclopentadienyl radical $(C_5H_5)$ is bonded to the Ti by a $\pi$ bond and the X is a halogen atom. A suggested structural formula for the compound is as follows:

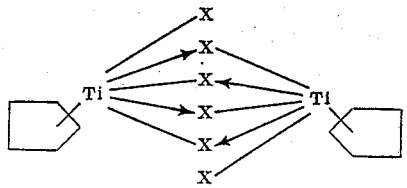

in which each Ti is $\pi$ bonded to its respective cyclopentadienyl ring and the 6 halogens are characterized by 4 bridge bonds and 2 covalent bonds.

The invention further contemplates a method for the preparation of di-cyclopentadienyl di-titanium hexa-halide compound having the above structural formula by reacting a mono-cyclopentadienyltitanium compound selected from a group of precursors consisting of mono-cyclopentadienyltitanium di-alkoxide mono-halide and mono-cyclopentadienyltitanium tri-halide with a halogen, the amount of said halogen employed being at least one mole for the sum of the titanium and the alkoxide groups in said precursor, and crystallizing and separating said di-cyclopentadienyl di-titanium hexa-halide compound therefrom.

It is convenient to carry out the reaction in the presence of a solvent. Most any inert solvent may be employed and among the most readily available are carbon tetrachloride, chloroform, hexane, cyclohexane, petroleum ether and tetrachloroethane.

The reaction is simple and straightforward. The halogen, which term as used herein will be understood to mean halides selected from the group consisting of chlorine, bromine and iodine, is merely reacted with the titanium precursor in the presence of an inert solvent and in an inert atmosphere such as argon or nitrogen. Usually a halogen in excess of the stoichiometric amounts to form the compound is used to permit a more complete reaction to take place. The reaction is usually run under atmospheric pressure but may be run at pressures greater than atmospheric if desired. Moreover the reaction is usually carried out at room temperature. However, the temperature employed is dependent upon the type of solvent used and/or the pressure and hence will vary considerably. Typical operating temperatures are in the range of from 0° C. to 45° C.

In order to describe more fully the instant invention, the following examples are presented.

EXAMPLE I

*Preparation of precursor*

One of the precursors used in forming the derivatives of this invention is cyclopentadienyltitanium di-butoxide mono-chloride which is prepared in the following manner:

One mole of ethyl magnesium chloride dissolved in 300 ml. of ethyl ether and 300 ml. of toluene at a temperature of 55° C. to 60° C. was slowly admixed with stirring with 1.2 moles of freshly distilled cyclopentadiene over a period of about 2 hours. The reaction mix was then refluxed for another 3 hours to produce a cyclopentadienyl Grignard.

250 ml. of the above ethyl ether-toluene solution containing 0.31 mole of cyclopentadienyl Grignard were added in ¾ of an hour with stirring under a nitrogen atmosphere to an ethyl ether solution maintained at 15° C. and containing 0.31 mole of butyl titanate. Benzene was added to replace some of the ethyl ether which was distilled off. A portion of this benzene diluted solution containing 0.21 mole of the soluble titanium compound was admixed with 0.0071 mole of titanium tetrachloride and a light colored precipitate of a magnesium salt settled out. The solvents were removed from the supernatant liquid and the solvent-free product was vacuum distilled to produce the mono-cyclopentadienyltitanium di-butoxide mono-chloride.

*Preparation of di-cyclopentadienyl di-titanium hexa-chloride*

In order to prepare the derivative compound di-cyclopentadienyl di-titanium hexa-chloride from the above described precursor, 0.13 mole of mono-cyclopentadienyltitanium di-butoxide mono-chloride was admixed in 100 ml. of carbon tetrachloride at room temperature and chlorine gas at the rate of 100 cc./min. was allowed to pass through the solution for 1 hour. After the addition of the chlorine gas the solution was allowed to stand overnight in the refrigerator at 5° C. during which time reddish-orange crystals of di-cyclopentadienyl di-titanium hexa-chloride were formed. These crystals were analyzed and were found to have a molecular weight corresponding to the formula $(C_5H_5)_2Ti_2Cl_6$, and to evidence a condensed type structure by infra-red. These crystals also had a sharp melting point between 208–210° C.

In order to show the effectiveness of this compound as a catalyst in polymerization reactions, it was used to polymerize methyl methacrylate by the following procedure:

0.05 gram of the di-cyclopentadienyl di-titanium hexa-chloride was dissolved in 50 grams of an inhibitor-free methyl methacrylate. This solution was then added under nitrogen atmosphere with stirring to 100 ml. H$_2$O containing 1 gram of ethyl sulfonate, which is a surface active agent, and 0.0159 gram of oxalic acid. After 3½ hours heating at 72–78° C. a white emulsion was formed which was added to 500 ml. methyl alcohol to precipitate a finely divided white methyl methacrylate polymer which was filtered, dried and recovered. This polymer was tested and found to be superior to known grades of methyl methacrylate polymers in that the polymer prepared by the catalyst of this invention was tougher and had a higher molecular weight.

EXAMPLE II

In the preceding example the di-cyclopentadienyl di-titanium hexa-chloride compound of this invention was prepared by using cyclopentadienyltitanium di-butoxide mono-chloride as the precursor.

The procedure used in Example I was repeated except that in this instance the precursor used was mono-cyclopentadienyltitanium tri-chloride prepared by reacting titanium tetrachloride, instead of butyl titanate, with an ethyl ethertoluene solution containing cyclopentadienyl Grignard.

The resulting compound comprised reddish-orange crystals which appeared to have the same structural formula as that of the di-cyclopentadienyl di-titanium hexa-chloride compound prepared in Example I. The molecular weight determinations showed the compound to be $$(C_5H_5)_2Ti_2Cl_6$$

and an examination of the compound by infra-red showed a condensed type structure which would fit this proposed type formula. Infra-red also showed the association of only one C$_5$H$_5$ group with each titanium atom. The stability and color of the compound was characteristic of chlorine bridges in the suggested formula. Finally, there was present the desired 6-fold coordination of the titanium atoms in this suggested structure.

The chemical analysis of the compounds prepared in accordance with Examples I and II are as follows:

CHEMICAL ANALYSIS OF COMPOUNDS

| Element | Ex. I Percent (Found) | | Ex. II Percent (Found) | | (C$_5$H$_5$)$_2$ Ti$_2$Cl$_6$ Percent (Calculated) |
| --- | --- | --- | --- | --- | --- |
| C | 27.3 | 27.5 | 27.8 | 27.9 | 27.35 |
| H | 2.5 | 2.7 | 3.9 | 4.3 | 2.28 |
| Cl | 48.6 | 48.6 | 43.9 | 46.0 | 48.6 |
| Ti | 21.6 | 22.3 | 23.0 | 23.7 | 21.9 |
| Molecular Wt | 408.0 | | 423.0 | 379.0 | 408.0 | 439.0 |

From the above description and by the examples presented it has clearly been shown that di-cyclopentadienyl di-titanium hexa-chloride may be prepared by reacting precursors selected from the group consisting of mono-cyclopentadienyltitanium di-alkoxide mono-chloride and monocyclopentadienyltitanium tri-chloride with chlorine gas. Equivalent compounds may be prepared by reacting the aforesaid precursors with other halogens such as bromine and iodine.

The product of the instant invention is a crystalline product which is much more stable, has greater resistance to hydrolysis and is less readily decomposable than its precursor. Moreover, it has been found to be useful as a catalyst in aqueous emulsion polymerizations as for example the polymerization of methyl methacrylate, styrene and similar olefins.

While this invention has been described and illustrated by the examples shown, it is not intended to be strictly limited thereto, and other variations and modifications may be employed within the scope of the following claims.

I claim:

1. A compound comprising di-cyclopentadienyl di-titanium hexa-chloride having the structural formula

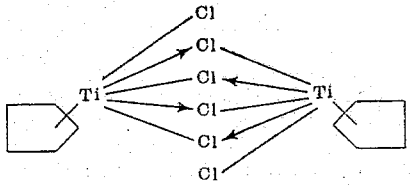

in which each Ti is π bonded to its respective cyclopentadienyl ring and the 6 chlorine atoms are characterized by 4 bridge bonds and 2 covalent bonds.

2. Method for preparing di-cyclopentadienyl di-titanium hexa-chloride comprising the steps of reacting a mono-cyclopentadienyltitanium compound selected from a group of precursors consisting of mono-cyclopentadienyltitanium di-alkoxide mono-chloride and mono-cyclopentadienyltitanium tri-chloride with an amount of chlorine gas added as moles which is numerically equal to the sum of the titanium and alkoxide groups in said precursor, said alkoxide being a lower alkoxide, and crystallizing and separating said di-cyclopentadienyl di-titanium hexa-chloride therefrom.

3. Method according to claim 2 wherein the precursor is mono-cyclopentadienyltitanium di-alkoxide mono-chloride and the amount of chlorine gas used is at least 3 moles.

4. Method according to claim 2 wherein the precursor is mono-cyclopentadienyltitanium tri-chloride and the amount of chlorine gas used is at least 1 mole.

5. Method according to claim 2 wherein the chlorine gas is reacted with the precursor in an inert atmosphere and at a temperature in the range of from 0° C. to 45° C.

6. Method according to claim 5 wherein the inert atmosphere is nitrogen.

No references cited.